(12) United States Patent
Hanamoto

(10) Patent No.: US 7,609,425 B2
(45) Date of Patent: Oct. 27, 2009

(54) IMAGE DATA PROCESSING APPARATUS, METHOD, STORAGE MEDIUM AND PROGRAM

(75) Inventor: Takashi Hanamoto, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 1085 days.

(21) Appl. No.: 10/763,220

(22) Filed: Jan. 26, 2004

(65) Prior Publication Data

US 2004/0150850 A1 Aug. 5, 2004

(30) Foreign Application Priority Data

Jan. 31, 2003 (JP) ............................. 2003-024539
Dec. 3, 2003 (JP) ............................. 2003-405130

(51) Int. Cl.
 G03F 3/08 (2006.01)
 G06F 15/00 (2006.01)
 G06K 9/00 (2006.01)
(52) U.S. Cl. .................... 358/518; 358/1.9; 382/167
(58) Field of Classification Search ................ 358/1.9, 358/3.27, 518, 1.2, 1.13, 523, 537, 540, 527; 382/167, 162
See application file for complete search history.

(56) References Cited

U.S. PATENT DOCUMENTS

| | | | | |
|---|---|---|---|---|
| 5,185,673 A | * | 2/1993 | Sobol | 358/296 |
| 5,777,624 A | * | 7/1998 | Munson | 345/605 |
| 5,991,511 A | * | 11/1999 | Granger | 358/1.9 |
| 6,301,393 B1 | * | 10/2001 | Spaulding et al. | 382/240 |
| 7,054,032 B2 | * | 5/2006 | Kato | 358/1.9 |
| 7,119,936 B2 | * | 10/2006 | Kowarz et al. | 359/224 |
| 7,158,670 B1 | * | 1/2007 | Fushiki et al. | 382/167 |
| 7,308,135 B2 | * | 12/2007 | Spaulding et al. | 382/162 |
| 7,408,676 B2 | * | 8/2008 | Yazawa et al. | 358/1.9 |
| 2002/0102019 A1 | * | 8/2002 | Piatt et al. | 382/165 |
| 2002/0196346 A1 | * | 12/2002 | Nishio et al. | 348/207.2 |
| 2003/0052894 A1 | * | 3/2003 | Akiyama et al. | 345/589 |
| 2004/0114159 A1 | * | 6/2004 | Couwenhoven et al. | 358/1.9 |
| 2004/0239744 A1 | * | 12/2004 | Otsuki | 347/105 |
| 2004/0252906 A1 | * | 12/2004 | Liege et al. | 382/254 |
| 2007/0133026 A1 | * | 6/2007 | Kumada et al. | 358/1.9 |

FOREIGN PATENT DOCUMENTS

JP 2003-198909 A 7/2003
WO WO 2004/028143 A1 1/2004

* cited by examiner

Primary Examiner—Madeleine A Nguyen
(74) Attorney, Agent, or Firm—Fitzpatrick, Cella, Harper & Scinto

(57) ABSTRACT

Processing for printing image data is speeded up while color gamut is widened and tonality enhanced. An image data processing apparatus for achieving this includes a print-quality acquisition unit adapted to acquire information relating to print quality, and a selection unit adapted to select a combination of a color space and bit precision to which the image data to be printed will be converted, based upon the acquired information relating to print quality. The image data is converted to the color space and bit precision selected by the selection unit.

4 Claims, 17 Drawing Sheets

FIG. 2

| MEDIA NAME | COLOR SPACE | BIT PRECISION |
|---|---|---|
| PROFESSIONAL PHOTO PAPER | xRGB | 16 |
| GLOSSY PAPER | xRGB | 16 |
| ... | ... | ... |
| POSTCARD | sRGB | 8 |
| PLAIN PAPER | sRGB | 8 |

MEDIA INFORMATION DATABASE 201

FIG. 3
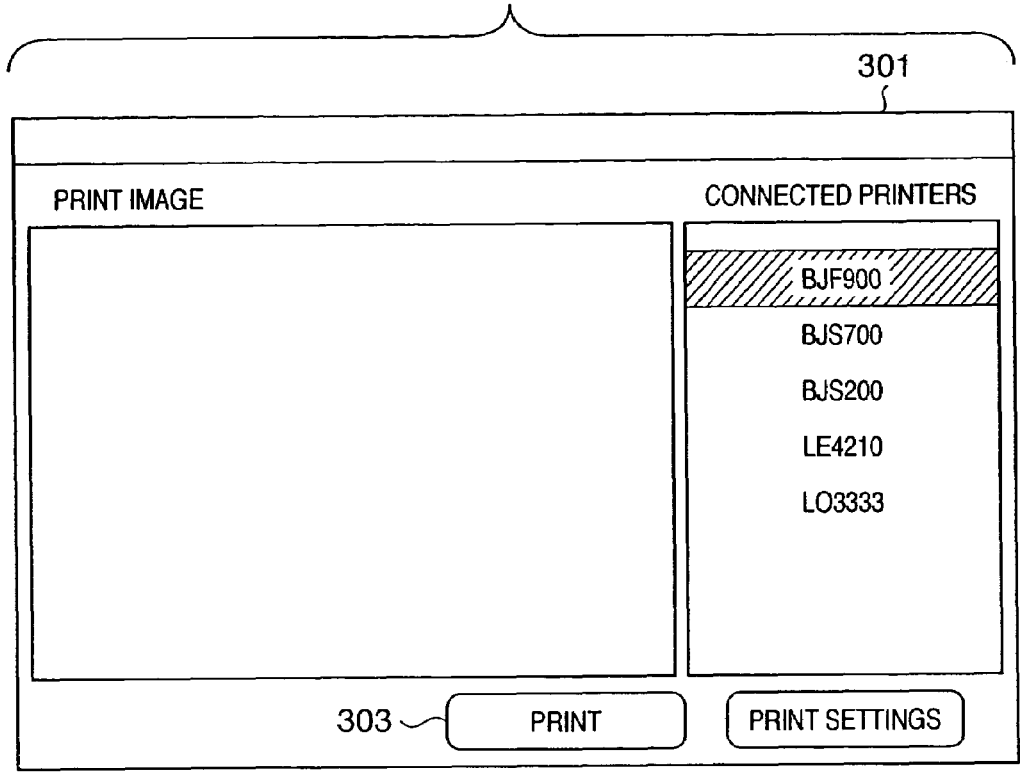
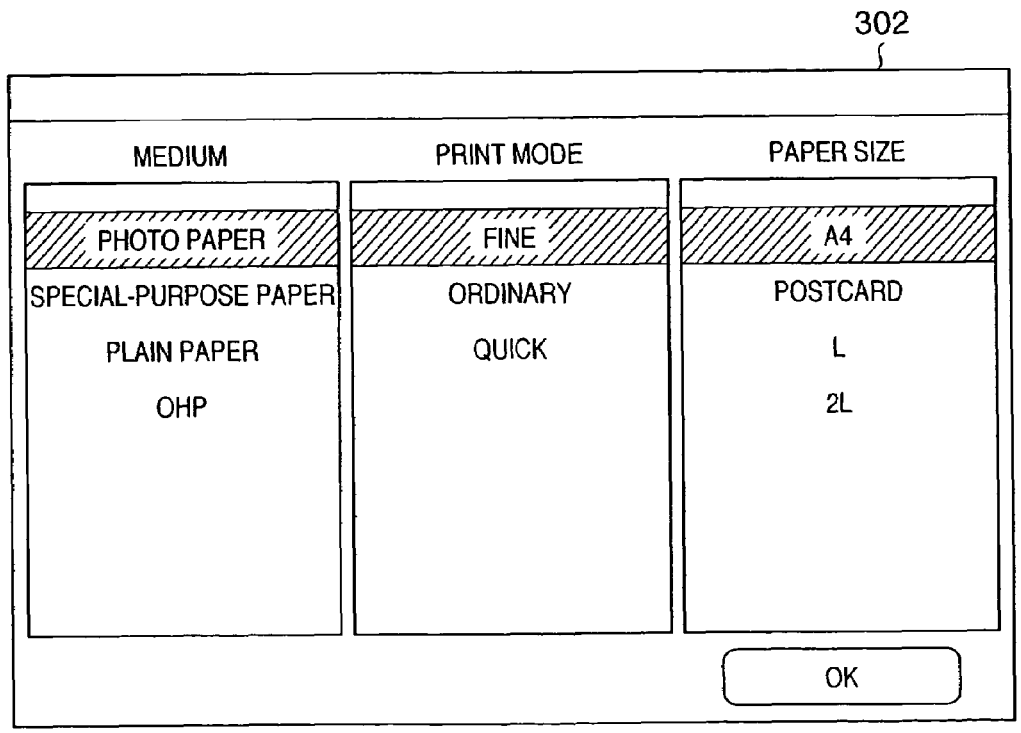

FIG. 8

CONVERSION METHOD 801 FOR CONVERSION FROM YCbCr TO WideGamutRGB $$\begin{pmatrix} Y/255 \\ (Cb-128)/255 \\ (Cr-128)/255 \end{pmatrix} \rightarrow \begin{pmatrix} X_{D65} \\ Y_{D65} \\ Z_{D65} \end{pmatrix} \;\text{–①}\qquad \begin{pmatrix} X_{D65} \\ Y_{D65} \\ Z_{D65} \end{pmatrix} \rightarrow \begin{pmatrix} X_{D50} \\ Y_{D50} \\ Z_{D50} \end{pmatrix} \;\text{–②}$$

$$\begin{bmatrix} R_{WGamutRGB} \\ G_{WGamutRGB} \\ B_{WGamutRGB} \end{bmatrix} = \begin{bmatrix} 1.4623 & -0.1845 & -0.2734 \\ -0.5529 & 1.4480 & 0.0681 \\ 0.0346 & -0.0958 & 1.2877 \end{bmatrix} \begin{bmatrix} X_{D50} \\ Y_{D50} \\ Z_{D50} \end{bmatrix} \;\text{–③}$$

$$\begin{pmatrix} R_{WGamutRGB} \\ G_{WGamutRGB} \\ B_{WGamutRGB} \end{pmatrix} \rightarrow \begin{pmatrix} R'_{WGamutRGB} \\ G'_{WGamutRGB} \\ B'_{WGamutRGB} \end{pmatrix} \;\text{–④}\quad \text{(Linear-TO-NonLinear GAMMA CONVERSION)}$$

$$\begin{aligned} R_{(16)} &= \text{round}(R'_{WGamutRGB} \times 65535) \\ G_{(16)} &= \text{round}(G'_{WGamutRGB} \times 65535) \\ B_{(16)} &= \text{round}(B'_{WGamutRGB} \times 65535) \end{aligned} \;\text{–⑤}$$

CONVERSION METHOD 802 FOR CONVERSION FROM YCbCr TO sRGB $$\begin{pmatrix} R \\ G \\ B \end{pmatrix} = \begin{pmatrix} 1.000 & 0.000 & 1.402 \\ 1.000 & -0.3441 & -0.7141 \\ 1.000 & 1.772 & 0.000 \end{pmatrix} \begin{pmatrix} Y/255 \\ (Cb-128)/255 \\ (Cr-128)/255 \end{pmatrix} \;\text{–①}$$

$$\begin{pmatrix} R \\ G \\ B \end{pmatrix} \rightarrow \begin{pmatrix} R' \\ G' \\ B' \end{pmatrix} \;\text{–②}\quad \text{(Linear-TO-NonLinear GAMMA CONVERSION)}$$

$$\begin{aligned} R_{(8)} &= \text{round}(R'_{sRGB} \times 65535) \\ G_{(8)} &= \text{round}(G'_{sRGB} \times 65535) \\ B_{(8)} &= \text{round}(B'_{sRGB} \times 65535) \end{aligned} \;\text{–⑤}$$

PORTRAIT MODE

SCENERY MODE

NIGHT SCENERY MODE

AUTOMATIC MODE

IMAGE DATA PROCESSING APPARATUS, METHOD, STORAGE MEDIUM AND PROGRAM

FIELD OF THE INVENTION

This invention relates to a processing technique for processing image data.

BACKGROUND OF THE INVENTION

Improvements in the capabilities of image data processing devices such as printers and digital cameras in recent years have been accompanied by utilization of color space of wider color gamuts in the processing of image data.

In a digital camera, for example, color correction processing is executed in a color space having a wide color gamut, examples of such a color space being sRGB and Adobe RGB. The flow of image processing in a digital camera having a color correction processing function disclosed in the specification of Japanese Patent Application Laid-Open No. 2003-198909 will be described with reference to FIG. 17 as an example of such processing.

As shown in FIG. 17, light is introduced to the lens of a digital camera in response to pressing of a shutter-release button (step S1701), and the incident light is made to impinge upon a sensor such as a CCD or CMOS so that the optical signal is converted to an RGB digital signal (step S1702).

Next, this digital image data is subjected to interpolation processing followed by processing such as white-balance processing (step S1703). The image data that has undergone interpolation processing is subjected to a color correction by sRGB color space or by the wider Adobe RGB color space based upon a designation made by the user (step S1704). (For reference purposes, the color gamuts of sRGB color space and Adobe RGB color space are indicated at 1601 and 1602 in FIG. 16.)

After the color-corrected image data is subjected to gamma processing in conformity with the monitor output (step S1705), the image data is subjected to JPEG (Joint Photographic Experts Group) compression (step S1706). One series of image processing operations is thus completed.

Thus, in the case of a digital camera, color correction processing utilizing a color space having a wide color gamut is executed in image processing up to the compression and storage of image data captured by photography.

In recent years, not only widening of color-space color gamut but also higher tonality is sought in processing of image data in an image data processing apparatus. For this reason, an improvement in the bit precision of image data processed is contemplated for, e.g., printers, for the purpose of widening the color gamut of color space and raising tonality.

In the case of a printer, however, when image data is subjected to print processing based upon a high bit precision, a problem which arises is that if the printing medium is of low quality, print processing takes an inordinately long period of time considering the low quality of the printed results. In other words, as far as the user is concerned, the desired printed result is not obtained despite the fact that print processing is executed over an extended period of time.

In view of these circumstances, lowering the bit precision has been considered as a measure to shorten the time needed for print processing. However, if bit precision is simply lowered under a wide color gamut, tonality will decline. That is, in a case where bit precision is raised in order to realize a wider color gamut and higher tonality in a printer, implementing this upon taking into account a balance between print-processing time and quality of printed results is preferred in view of suitability to user needs.

Similarly, in the case of a digital camera, it is necessary to take into account the balance between color gamut and tone in regard to realizing a wide color gamut and higher tonality. For example, as mentioned above, the color space used in the color correction of step S1704 is specified by the user. Since the JPEG scheme has a bit precision of eight bits, however, the color gamut of the captured image data will widen but tonality will decline if Adobe RGB color space is specified by the user. Such a decline in tonality becomes especially conspicuous in cases where the subject of photography is a human being.

More specifically, in a case where color-correction processing using sRGB color space and color-correction processing using Adobe RGB color space is performed with same bit precision, the color-correction processing using sRGB color space provides better tonality than the color-correction processing using Adobe RGB color space.

This means that in a case where the subject is something other than a human being, such as scenery, color gamut should be emphasized and Adobe RGB color space specified. On the other hand, if the subject is a human being, the tonality of skin color should be emphasized and sRGB color space should be specified.

Thus, with regard to widening color gamut and improving tonality in a digital camera, implementing this upon taking into account the nature of the subject is preferred in view of suitability to user needs.

SUMMARY OF THE INVENTION

Accordingly, an object of the present invention is to widen color gamut and improve tonality in processing of image data in an image data processing apparatus, and to execute image processing that is suited to user needs.

More specifically, an object of the present invention is to realize higher speed while widening color gamut and improving tonality in processing for printing image data.

A further object of the present invention is to widen color gamut and improve tonality suitably in accordance with the subject of photography in processing for applying a color correction to image data that has been captured by photography.

According to the present invention, the foregoing objects are attained by providing an image data processing apparatus for processing image data to be printed, comprising:

a print-quality acquisition unit adapted to acquire information relating to print quality; and a selection unit adapted to select a combination of a color space and bit precision to which the image data to be printed will be converted, based upon the acquired information relating to print quality;

wherein the image data is converted to the color space and bit precision selected by the selection unit.

By virtue of this arrangement, it is possible to select a color space and bit precision, which are used in processing at the time of printing, in accordance with information relating to print quality (e.g., type or resolution of the medium on which printing is performed). This makes it possible to provide an environment in which printing is performed with a wide color gamut for high-quality media, though processing time is prolonged, whereas high-speed printing can be carried out with regard to low-quality media.

More specifically, in the case of high-quality media, for example, processing with a high bit precision is executed in color space having a wide color gamut. In the case of low-quality media, processing is executed at high speed and bit rate is therefore lowered. However, in order to suppress a decline in tonality, color space is compressed and processing is executed using a smaller color space.

Further, according to another aspect of the present invention, the foregoing objects are attained by providing an image data processing apparatus comprising:

a photography mode setting unit adapted to set a photography mode at the time of photography;

a photography unit adapted to photograph a subject based upon the set photography mode;

a selection unit adapted to select a color space from a plurality of color spaces with a different color gamut in accordance with the photography mode; and a color conversion unit adapted to convert the color space of the photographed image data into the selected color space.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 2 is a diagram illustrating the essentials of a media information database in which color space and bit precision used in processing at the time of printing are registered on a per-medium basis in the image data processing apparatus according to the first embodiment of the present invention;

FIG. 3 is a diagram illustrating the essentials of a printing application used in the image data processing apparatus according to the first embodiment of the present invention;

FIG. 8 is a diagram illustrating a conversion method when 8-bit YCbCr data is converted to Wide Gamut RGB 16-bit data;

DETAILED DESCRIPTION OF THE PREFERRED EMBODIMENTS

Preferred embodiments of the present invention will now be described in detail in accordance with the accompanying drawings.

First Embodiment

This embodiment will be described with regard to a case where printing is performed upon selecting color space and bit precision in accordance with the type of medium on which printing is performed (i.e., in accordance with information relating quality of printing).

Figure 1:
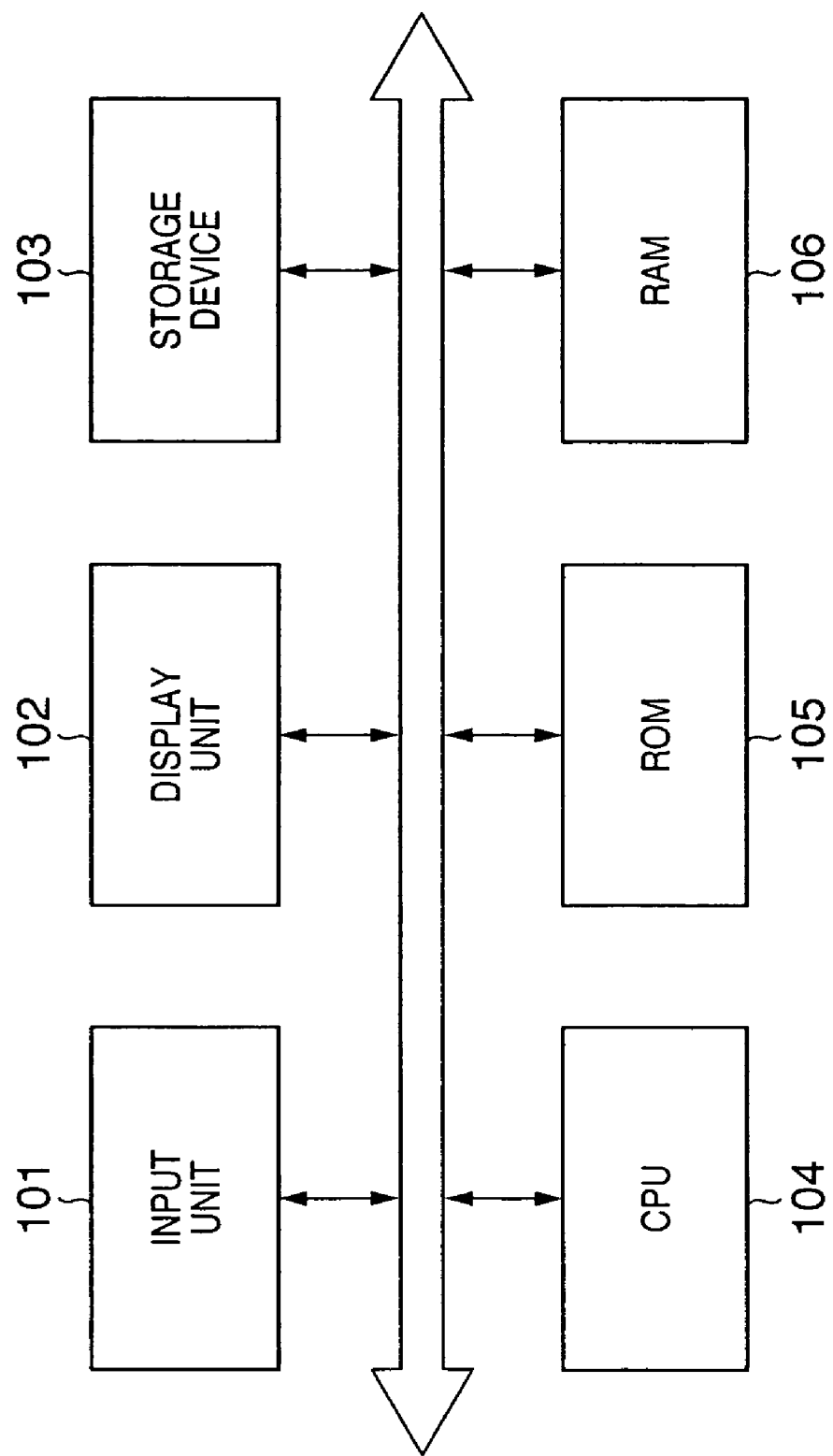
FIG. 1 is a block diagram illustrating the system configuration of an image data processing apparatus according to first to third embodiments of the present invention.

FIG. 1 is a block diagram illustrating the system configuration of an image data processing apparatus according to first to third embodiments of the present invention. (It should be noted that this image data processing apparatus may function as part of a printer or may function as a separate apparatus that is connected to a printer. The same will hold true in second and third embodiments.)

As shown in FIG. 1, the apparatus includes an input unit 101 for entering commands and data from a user and includes a pointing system such as a keyboard and mouse. A display unit 102, which is a device that displays a GUI (Graphical User Interface) and the like, usually employs a CRT or liquid crystal display. A storage device 103 stores image data and programs and usually employs a hard disk. A CPU 104 executes all processing involving the components mentioned above. A ROM 105 and a RAM 106 provide the CPU 104 with programs, data and working areas necessary for the above processing. It is assumed that a control program necessary for processing indicated by a flowchart described below has been stored in the storage unit 103 or in the ROM 105. In a case where the control program has been stored in the storage unit 103, the program is executed upon storing it temporarily in the RAM 106.

It should be noted that the system configuration of the image data processing apparatus according to this embodiment includes various components other than those mentioned above. However, as these other components do not have a direct bearing upon the present invention, they are not described here.

FIG. 3 is a diagram illustrating the essentials of a printing application used in the image data processing apparatus according to this embodiment. In a printing application 301, the printer to be used in printing is selected and a print setting button is pressed, whereby a print setting dialog screen 302 is displayed. This makes it possible to set media, printing mode and paper size. By pressing a print button 303 upon completion of the settings, printing of the image starts.

FIG. 2 is a diagram illustrating the essentials of a media information database 201 in which a combination of color space and bit precision used in processing at the time of printing is registered for every printing medium. In the case of low-quality media, such as plain paper or postcards, sRGB is registered as the color space and 8 bits as the bit precision. In the case of high-quality media, xRGB, which has a color gamut wider than that of sRGB, is registered as the color space, and 16 bits as the bit precision. In other words, the media information database 201 has a plurality of combinations in which the size of color space and bit precision both differ, and at least one combination from among these combinations has a lower bit precision and a wider color gamut in comparison with the other combinations. It should be noted that XRGB signifies, e.g., Wide Gamut RGB or Adobe RGB color space, etc. Wide Gamut RGB is a color space which has a color gamut wider than that of sRGB as well as Adobe RGB. A conversion method for conversion from YCbCr to Wide Gamut RGB is shown in 801 of FIG. 8.

Figure 4:
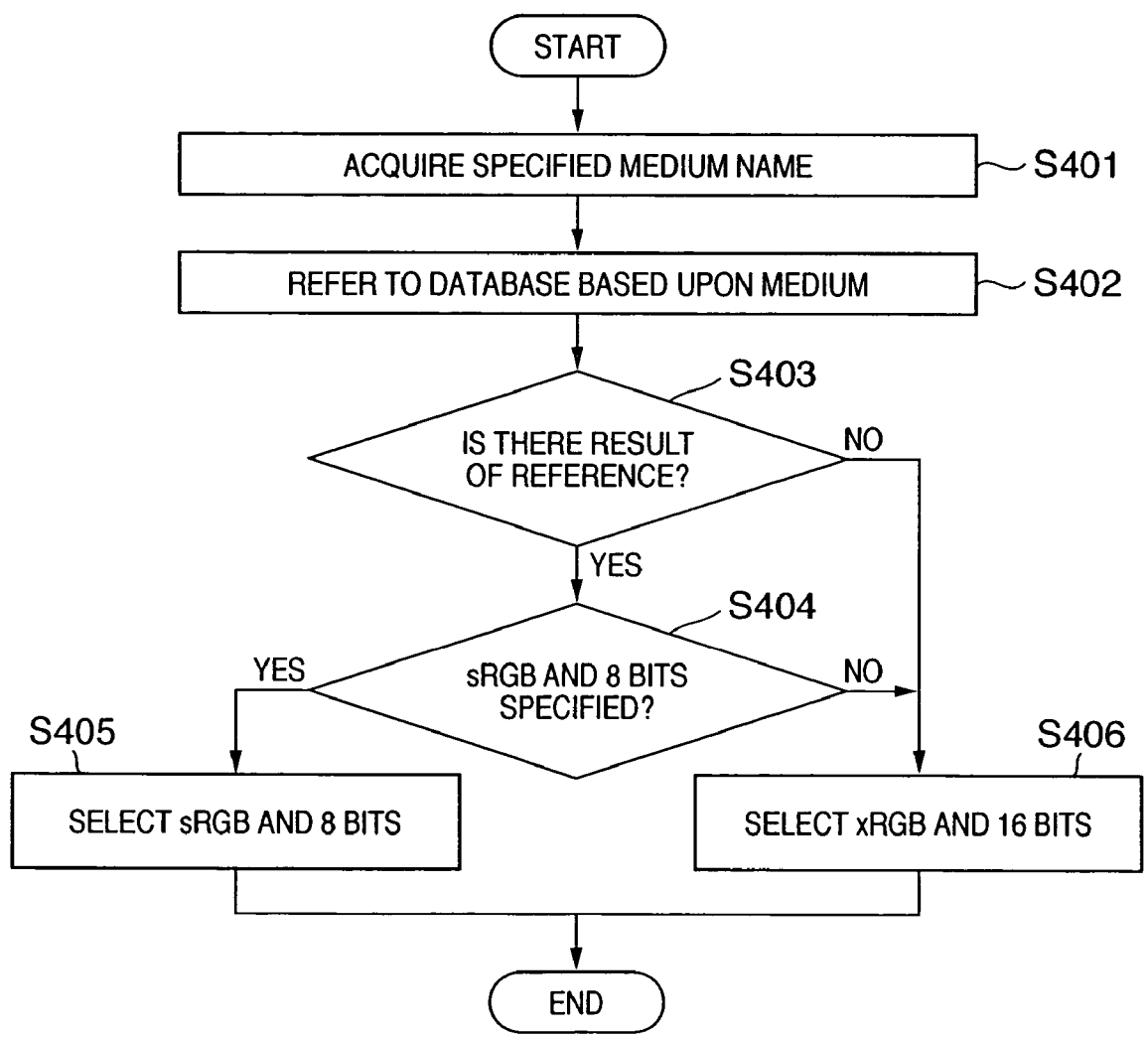
FIG. 4 is a flowchart for describing a process through which color space and bit precision used in processing at the time of printing are selected in accordance with the medium in the image data processing apparatus according to the first embodiment of the present invention.

FIG. 4 is a flowchart for describing a process through which color space and bit precision used in processing at the time of printing are selected in accordance with the medium on which printing is to be performed. At step S401, a medium name that has been specified on the print setting dialog screen 302 is acquired. This is followed by step S402, at which reference is had to the media information database 201 using the medium name required. Based upon the result of the reference made, it is determined at step S403 whether there are a color space and bit precision linked to this medium name. Control proceeds to step S404 if a color space and bit precision linked to the medium name exist, and to step S406 if these do not exist.

It is determined at step S404 whether the linked color space and bit precision are sRGB and eight bits, respectively. Control proceeds to step S405 in case of sRGB and eight bits, and to step S406 if the linked color space and bit precision are not sRGB and eight bits, respectively.

At step S405, sRGB and eight bits are selected, after which processing is exited. At step S406, xRGB and 16 bits are selected, after which processing is exited. Thus, by using the media information database, a color space and bit precision that are optimum for the specified printing medium can be selected.

Figure 5:
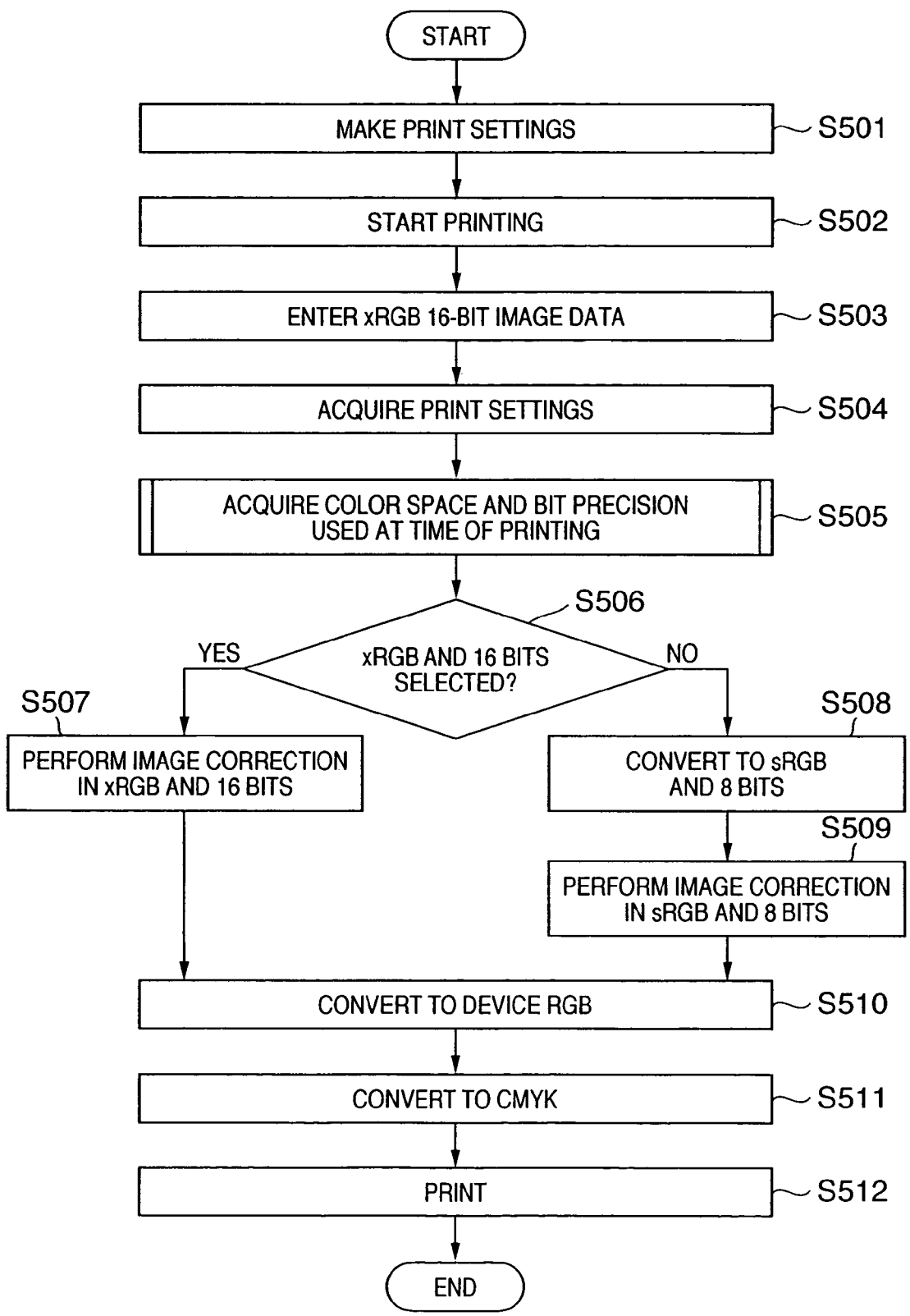
FIG. 5 is a flowchart for describing the flow print processing in the image data processing apparatus according to the first embodiment of the present invention.

FIG. 5 is a flowchart for describing a process through which printing is actually performed using the printing application 301. At step S501, the print setting dialog screen 302 is opened by the user and the printing settings are made. This is followed by step S502, at which the user presses the print button 303 to start print processing. Image data to be printed is then entered at step S503. Here it is assumed that the entered image data is image data in a color space (xRGB) having a color gamut wider than that of sRGB and that the data has a bit precision of 16 bits for each value of R, G, B.

Next, at step S504, print settings (medium, printing mode, paper size), which have been made using the print setting dialog screen 302, are acquired. Then, at step S505, the medium name is extracted from the acquired print settings, and color space and bit precision used at the time of printing are selected by the flowchart of FIG. 4.

It is determined at step S506 whether the selected color space and bit precision are xRGB and 16 bits, respectively. If the selected color space and bit precision are xRGB and 16 bits, respectively, then control proceeds to step S507. Otherwise, control proceeds to step S508.

At step S507, a color transformation is unnecessary and therefore an image correction for enhancing the appearance of the image data is performed with respect to 16-bit xRGB color space. On the other hand, in order to process the xRGB 16-bit image data at high speed, a conversion is made to sRGB and eight bits at step S508. Furthermore, at step S509, an image correction in order to enhance the appearance of the image data is performed with respect to the 8-bit sRGB data.

The corrected data is converted to Device RGB color space at step S510. Then, at step S511, Device RGB is converted to CMYK. Printing is executed at step S512 using the CMYK data.

Thus, in accordance with this embodiment, as should be evident from the above description, a wider color gamut and a higher tonality are achieved using a high bit precision in the case of a high-quality printing medium. On the other hand, in the case of a low-quality printing medium, the image data is compressed to a color space of a narrower color gamut and to a lower bit precision, whereby print processing can be executed at high speed while a decline in tonality is suppressed. Thus, processing suited to the needs of the user becomes possible.

Second Embodiment

According to the first embodiment, bit precision and color space are selected in dependence upon the medium on which image data is to be printed. However, this does not impose a limitation upon the present invention. In the second embodiment, a case where printing is performed upon selecting color space and bit precision in accordance with resolution at the time of printing (information relating to printing quality) will be described.

If resolution at the time of printing is low, the results of printing will be of low quality and even if printing of a wide color gamut is performed, the effect of this will not manifest itself. In a case where resolution is low, therefore, performing printing at high speed is better suited to user needs than performing printing that emphasizes a wide color gamut.

Since the system configuration of the image data processing apparatus according to this embodiment is that same as that of the first embodiment, it need not be described here.

Figure 6:
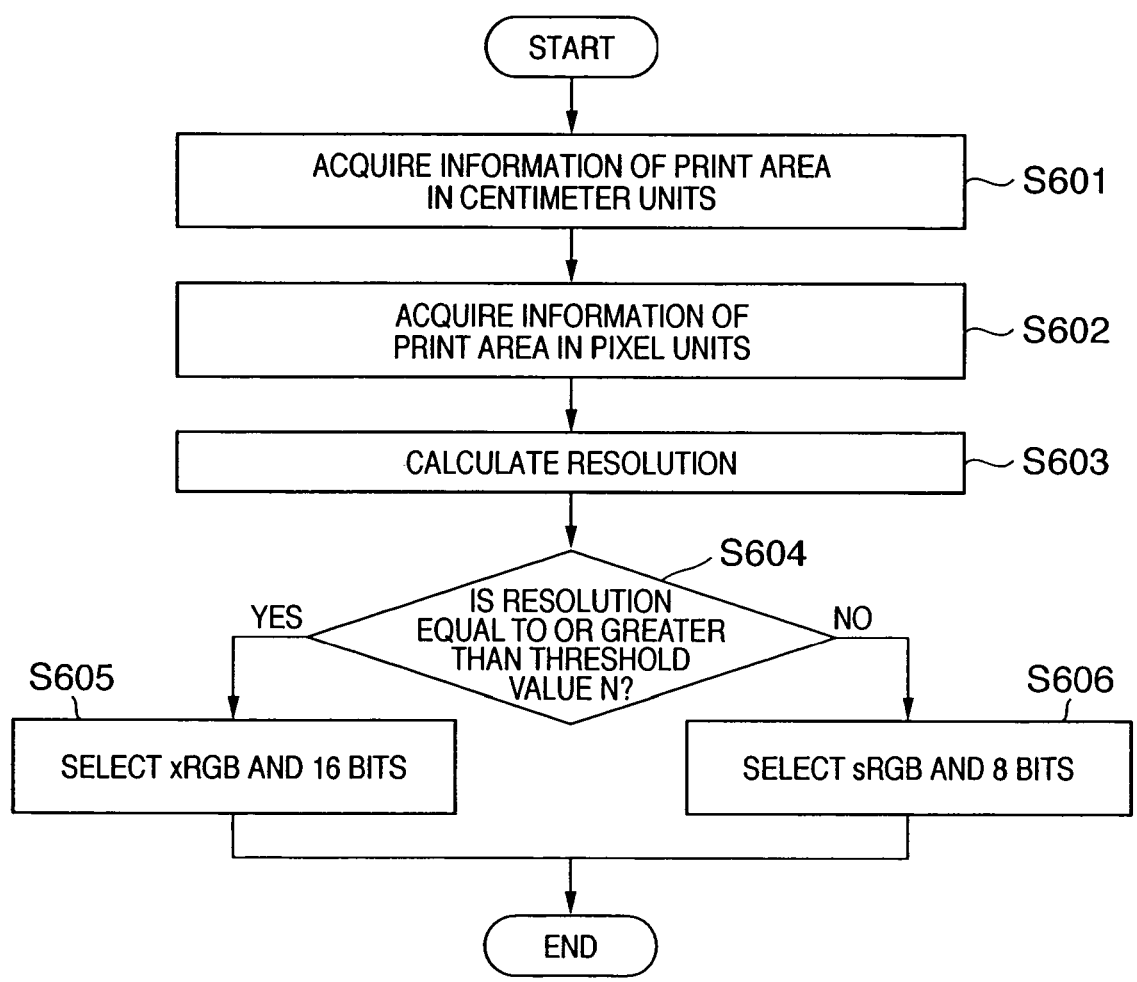
FIG. 6 is a flowchart for describing a process through which color space and bit precision are selected in accordance with the resolution at the time of printing in an image data processing apparatus according to a second embodiment of the present invention.

FIG. 6 is a flowchart for describing a process through which color space and bit precision employed in processing at the time of printing are selected in accordance with resolution at the time of printing. This flowchart corresponds to the processing of step S505 in the flowchart for print processing depicted in FIG. 5.

Step S601 in FIG. 6 calls for the acquisition of area information (vertical length×horizontal length) in centimeter units of the print area. Step S602 calls for the acquisition of area information (number of pixels vertically×number of pixels horizontally) in pixel units of the print area. Resolution (cm/pix) at the time of printing is calculated based upon the acquired area information (centimeters and number of pixels) at step S603.

It is determined at step S604 whether the resolution calculated at step S603 is equal to or greater than a predetermined threshold value N. Control proceeds to step S605 if the resolution is equal to or greater than the threshold value N, and to step S606 if the resolution is less than the threshold value N.

Since printing can be performed at a high resolution and high quality, xRGB and 16 bits are selected at step S605, after which processing is exited. At step S606, on the other hand, printing can only be performed at a low resolution and low quality and, hence, sRGB and eight bits are specified, after which processing is exited.

Thus, in accordance with this embodiment, as should be evident from the above description, a wider color gamut and a higher tonality are achieved using a high bit precision in a case where printing resolution is high and quality high at the time of printing. On the other hand, in a case where printing resolution is low and quality low at the time of printing, print processing is executed at high speed while a decline in tonality is suppressed by compressing image data to color space having a narrow color gamut and a low bit precision. Thus, processing suited to the needs of the user can be executed.

Third Embodiment

The first embodiment has been described in regard to a case where the entered image data is xRGB 16-bit data. However, in the third embodiment, a case where decoded image data is entered as YCbCr 8-bit JPEG data will be described. It should be noted that Wide Gamut RGB is used as xRGB.

Since the system configuration of the image data processing apparatus according to this embodiment is that same as that of the first embodiment, it need not be described here.

Figure 7:
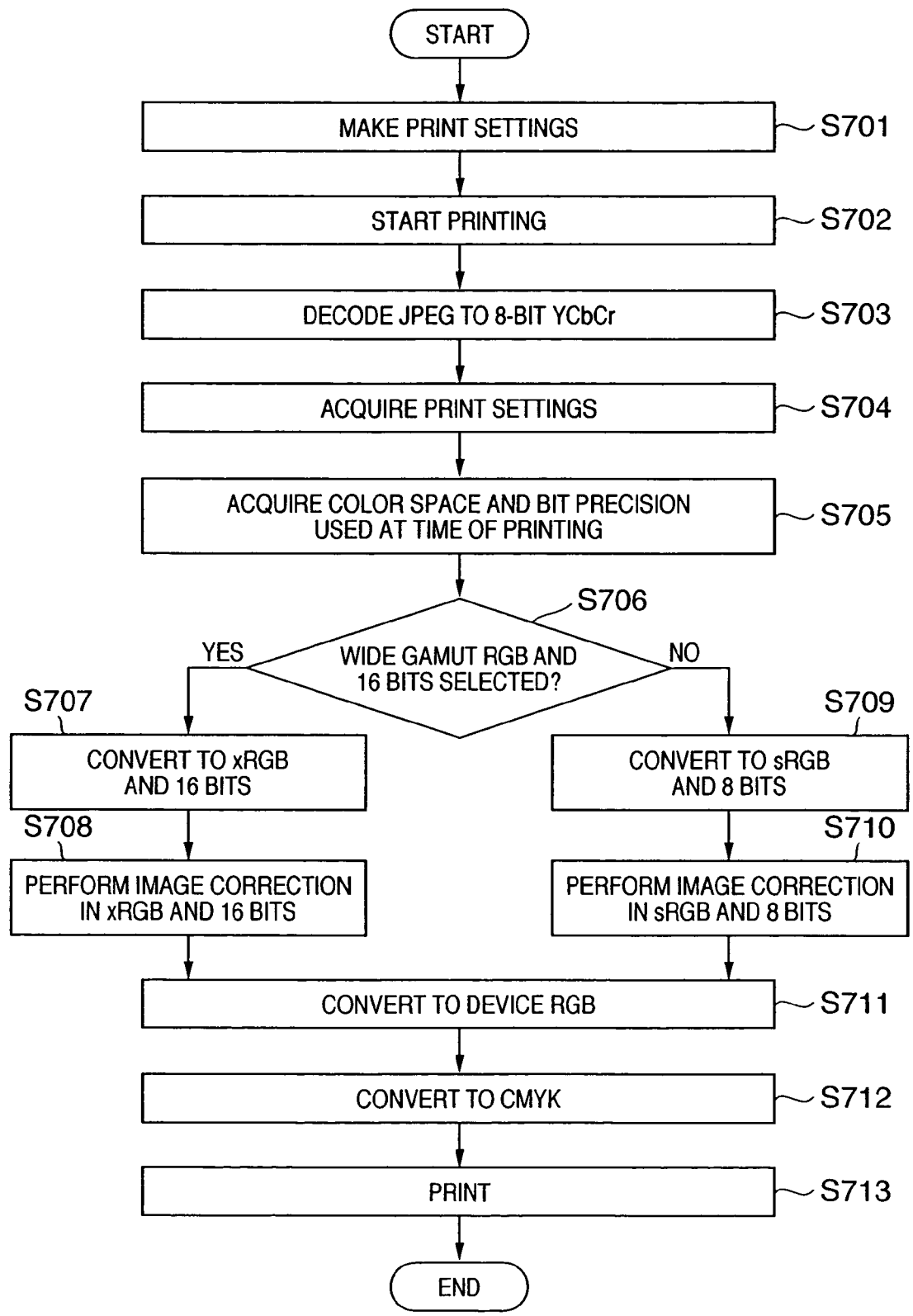
FIG. 7 is a flowchart for describing a process through which a JPEG image is printed in an image data processing apparatus according to a third embodiment of the present invention.

FIG. 7 is a flowchart for describing a process through which a JPEG image is printed. At step S701, the print setting dialog screen 302 is opened by the user and the printing settings are made. This is followed by step S702, at which the user presses the print button 303 to start print processing.

JPEG image data to be printed is decoded at step S703 to acquire 8-bit YCbYr data. Next, at step S704, print settings (medium, printing mode, paper size), which have been made using the print setting dialog screen 302, are acquired. Then, at step S705, the color space and bit precision used at the time of printing are selected in accordance with the flowchart of FIG. 4 or 6.

It is determined at step S706 whether the selected color space and bit precision are Wide Gamut RGB and 16 bits, respectively. If the selected color space and bit precision are Wide Gamut RGB and 16 bits, respectively, then control proceeds to step S707. Otherwise, control proceeds to step S709.

At step S707, the 8-bit YCbCr data is converted to Wide Gamut RGB 16-bit data. The conversion process at this time is indicated at conversion method 801 in FIG. 8. Next, at step S708, an image correction in order to enhance the appearance of the image data is performed with respect to the 16-bit Wide Gamut RGB data.

At step S709, the 8-bit YCbCr data is converted to sRGB 8-bit data. The conversion process at this time is indicated at conversion method 802 in FIG. 8. Next, at step S710, an image correction in order to enhance the appearance of the image data is performed with respect to the 8-bit sRGB data.

The corrected data is converted to Device RGB at step S711. Then, at step S712, Device RGB is converted to CMYK. Printing is executed at step S713 using the CMYK data.

Thus, even if the entered image data represents a JPEG image, print processing can be speeded up while suppressing a decline in tonality by converting the YCbCr data to xRGB 16-bit or sRGB 8-bit data in dependence upon the type of printing media or resolution in a manner similar to that of the first or second embodiment.

Fourth Embodiment

The first to third embodiments are described taking as an example a printer serving as an image data processing apparatus (or a device connected to but separate from a printer). The embodiments that follow will be described taking a digital camera as an example. A fourth embodiment of the present invention will be described first with reference to FIGS. 9 to 14.

Figure 10:
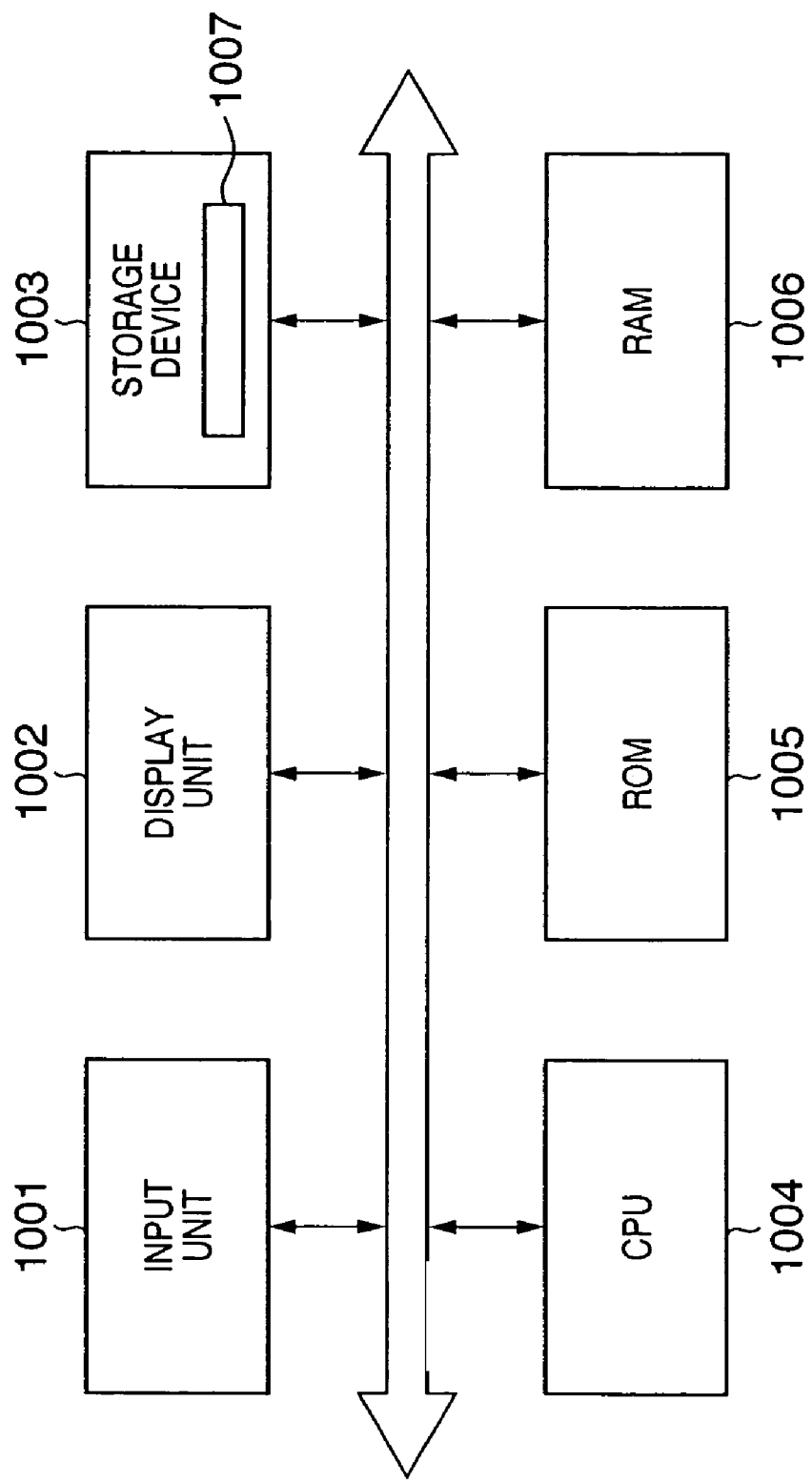
FIG. 10 is a block diagram illustrating the system configuration of a digital camera.

FIG. 10 is a diagram illustrating an example of the system configuration of a digital camera according to this embodiment. As shown in FIG. 10, this system comprises an input unit 1001, a display unit 1002, a storage device 1003, a CPU 1004, a ROM 1005 and a RAM 1006.

The input unit 1001 is for entering commands and data from a user and includes a pointing system such as a keyboard and mouse.

The display unit 1002, which is a device that displays a GUI and the like, usually employs a CRT or liquid crystal display.

The storage device 1003 stores image data and programs and usually employs a hard disk.

The CPU 1004 controls the overall operation of the system, executes processing involving the components mentioned above and executes image data processing according to this embodiment.

The ROM 1005 and a RAM 1006 are utilized as storage areas for programs relating to processing for various control, areas for storing image data, and working areas for various processing.

Figure 15:
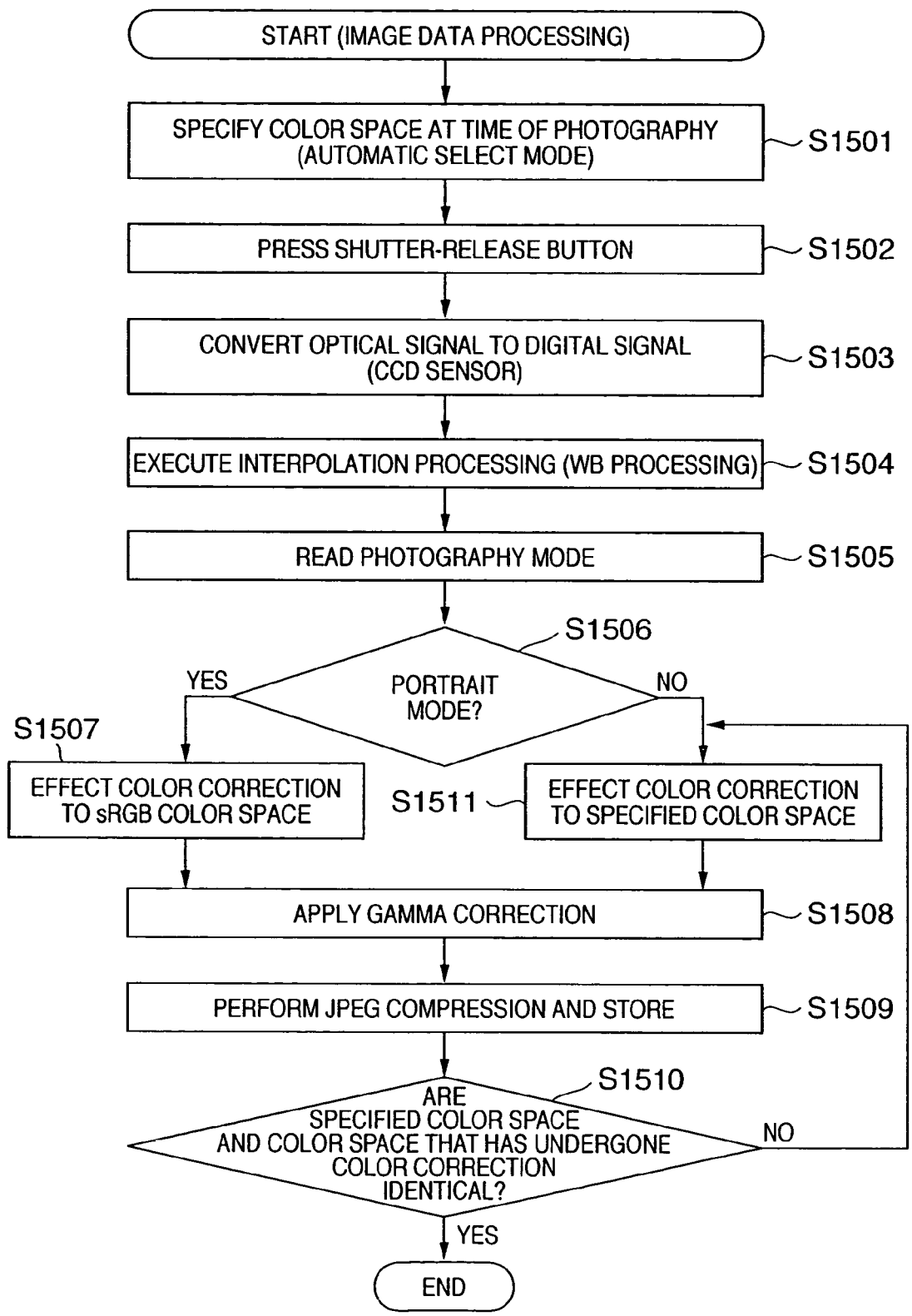
FIG. 15 is a flowchart illustrating image data processing executed by an image data processing apparatus (digital camera) according to a fifth embodiment of the present invention.

A control program 1007 for image data processing shown in FIGS. 9 and 15, which will be described later, can be stored in the storage device 1003 or ROM 1005. In a case where the program has been stored in the storage device 1003, the program is executed upon being read into the RAM 1006 temporarily.

It should be noted that the system configuration of the image data processing apparatus according to this embodiment includes various components (e.g., image sensing means and the like) other than those mentioned above. However, these other components are not described here.

Figure 11:
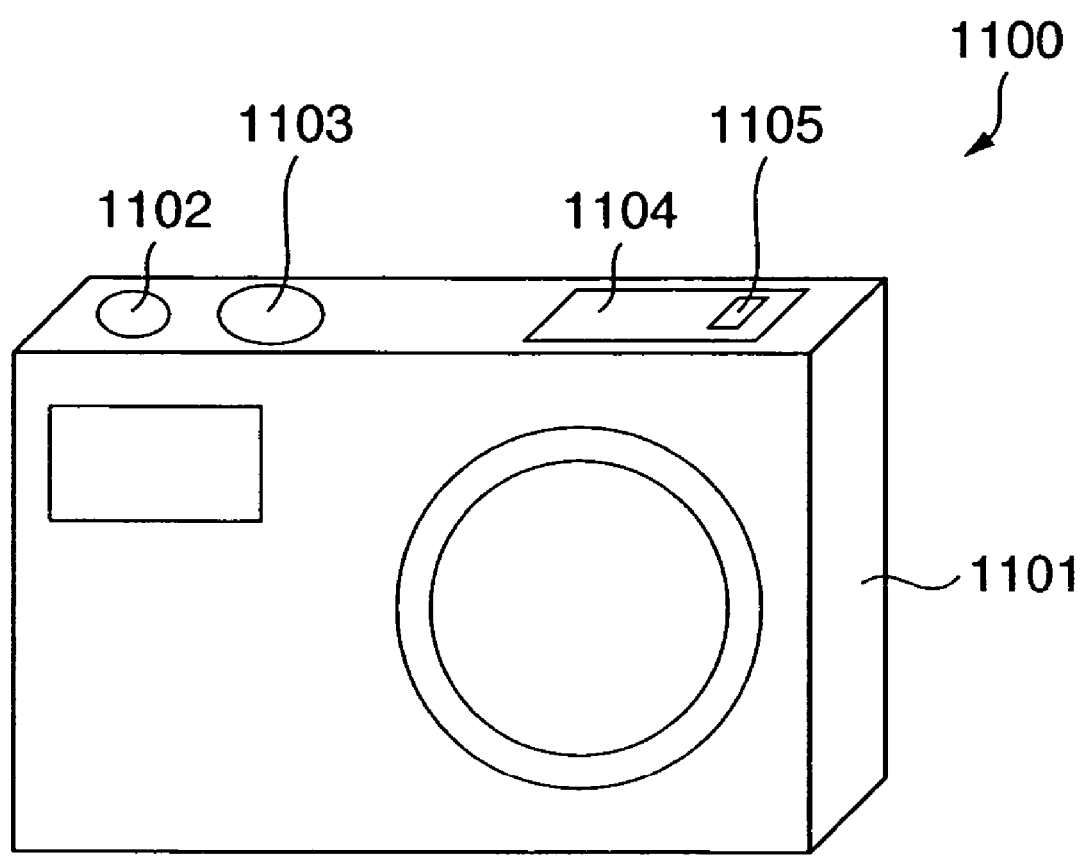
FIG. 11 is a perspective view illustrating the external configuration of a digital camera.
Figure 12A:
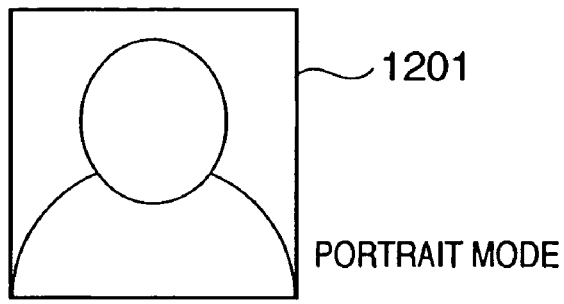
FIGS. 12A to 12D are an explanatory views illustrating photography modes.
Figure 12B:
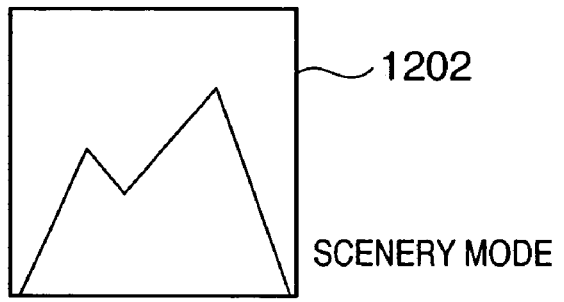
Figure 12C:
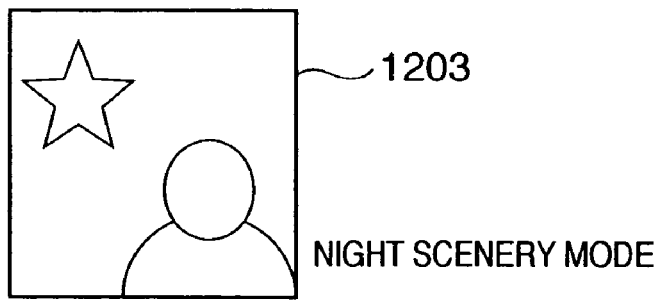
Figure 12D:
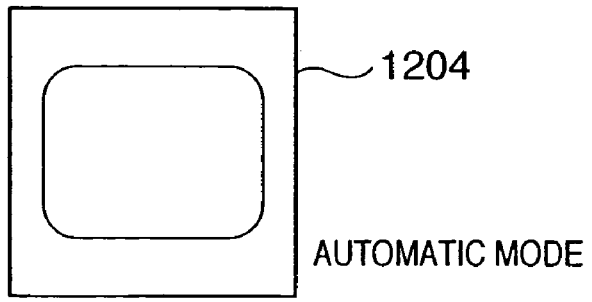

FIG. 11 illustrates an external view of a digital camera in which captured image data is acquired as a JPEG file.

A bit precision of a JPEG file is usually fixed to eight bits. Therefore, in the case of the digital camera in which captured image data is acquired as a JPEG file in the present embodiment, it is necessary to select whether tonality or color gamut is to be emphasized.

A digital camera 1100 is provided with a mode dial 1103 for changing the mode of photography. A change can be made to any of four photography modes at the time of photography by turning the mode dial 1103.

FIGS. 12A to 12D illustrate an example of photography modes selected by the mode dial 1103. These modes include a portrait mode 1201 for photographing a person, a scenery mode 1202 for photographing scenery, a night scenery mode 1203 for photography a night scene, and an automatic mode 1204 used to photograph most other scenes. (In other words, the mode of photography is changed over in accordance with the scene photographed.) Whenever the mode dial 1103 is turned, the mode of photography changes and the mode currently selected is displayed in the form of an icon representing a selected mode 1105 on a liquid crystal panel 1104.

By pressing a shutter-release button 1102, a picture is taken according to the currently selected mode of photography and a JPEG file is obtained.

Figure 13:
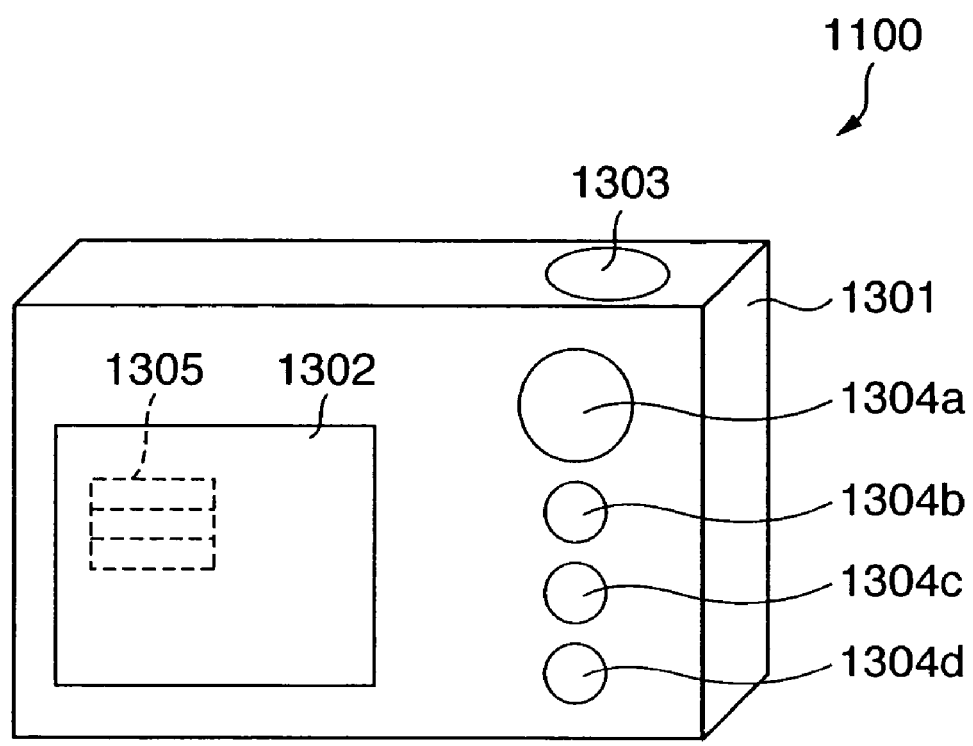
FIG. 13 is a perspective view illustrating the back side of the digital camera.

FIG. 13 illustrates a back side 1301 of the digital camera 1100. The back side 1301 of the digital camera 1100 is provided with a liquid crystal display 1302. A UI (User Interface) for setting the digital camera 1100 in various ways is displayed on the liquid crystal display 1302. The UI is operated using operating buttons 1304a to 1304d.

Figure 14:
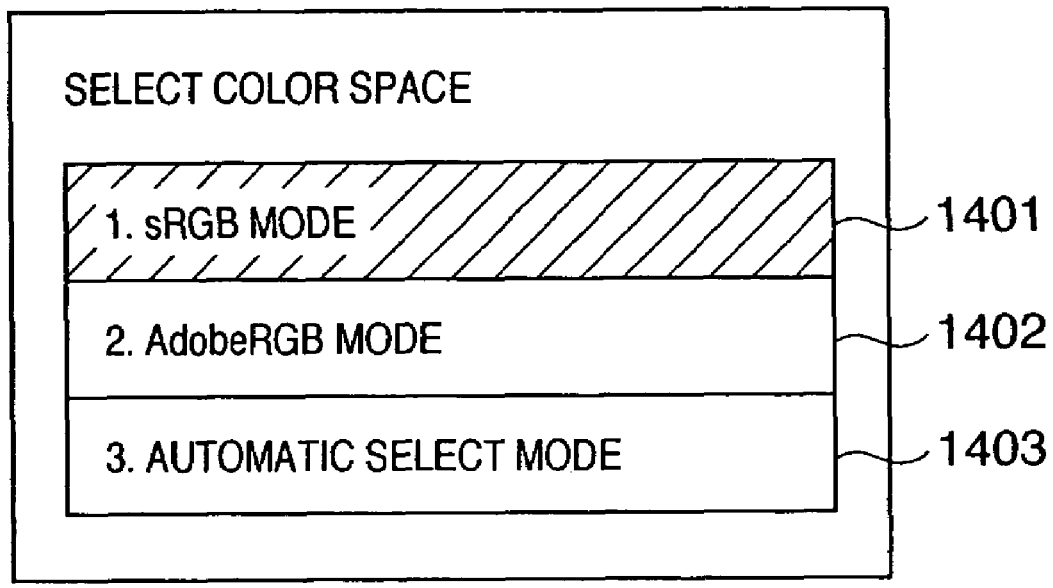
FIG. 14 is an explanatory view illustrating color space modes also on an operation display.

FIG. 14 illustrates an example of an operating screen 1305 for setting a color space mode. In order to change over the color space at the time of photography, an sRGB mode 1401, an Adobe RGB mode 1402 and an automatic select mode 1403 are displayed on the operating screen 1305. The sRGB mode 1401 is a mode for executing color correction processing using sRGB color space, and the Adobe RGB mode 1402 is a mode for executing color correction processing using Adobe RGB color space. The sRGB color space and the Adobe RGB color space are defined by color gamuts of the kind shown in FIG. 16 mentioned earlier.

When these color spaces are selected, the UI of the operating screen 1305 is displayed on the liquid crystal display 1302 and a color space can be designated by selecting it from among the three color spaces 1401 to 1403.

In a case where the automatic select mode 1403 has been selected, the content of the data obtained by photographing the subject is evaluated and whether tonality should be emphasized or gamut emphasized is recognized automatically giving primary consideration to the setting of the photography modes 1201 to 1204.

The operation of this apparatus will now be described.

Figure 9:
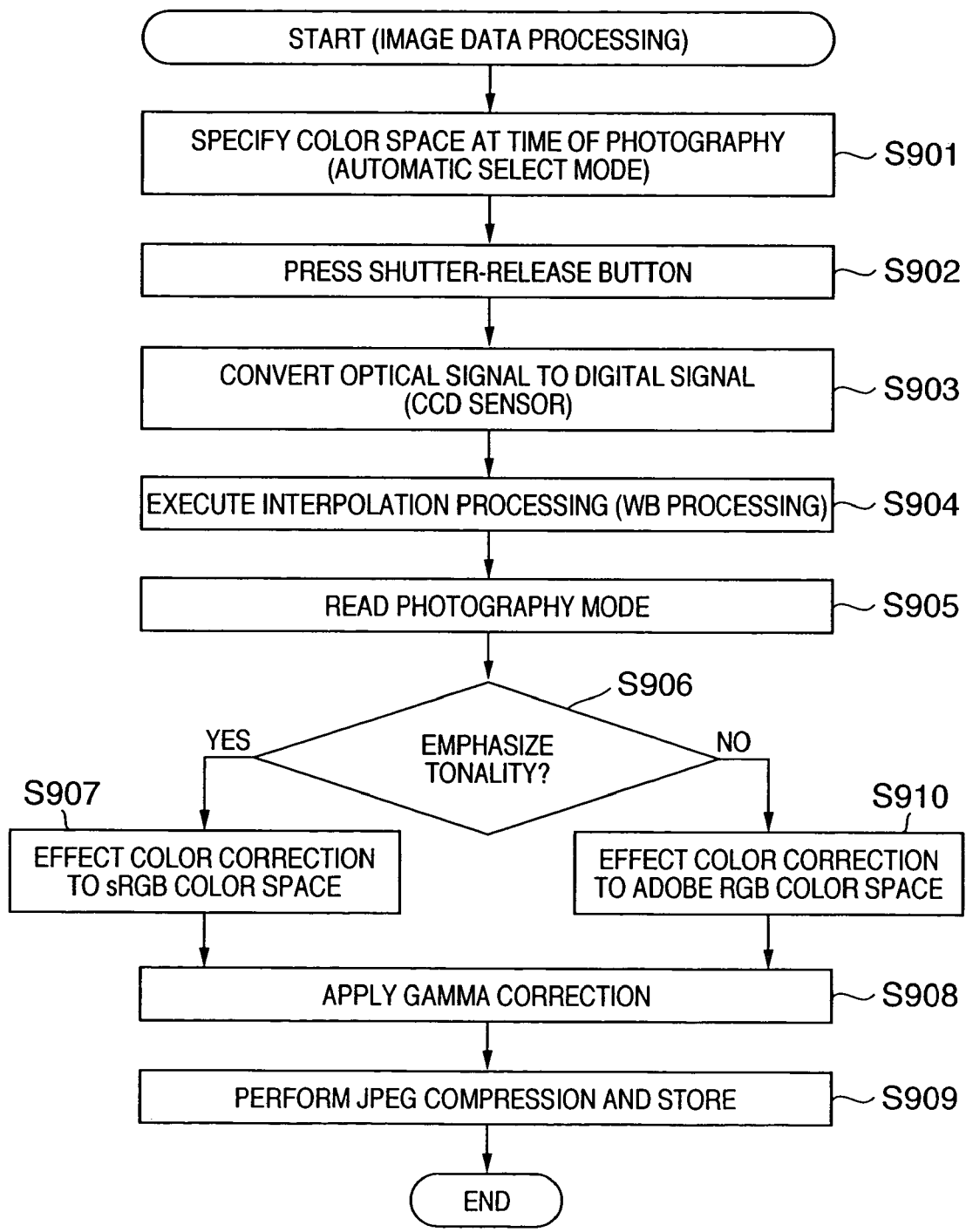
FIG. 9 is a flowchart illustrating image data processing executed by an image data processing apparatus (digital camera) according to a fourth embodiment of the present invention.

FIG. 9 is a flowchart of image data processing in the image data processing apparatus (digital camera) according to this embodiment. This embodiment will be described with regard to color correction processing in a case where the automatic select mode 1403 has been selected as the color space when photographing a subject by the digital camera 1100.

The automatic select mode 1403 is set as the color space using the operating screen 1305 at step S901.

Shutter-release button 1303 is pressed at step S902 in order to photograph the subject.

Next, the subject is photographed using an image sensing device such as a CCD sensor and an optical signal that is the captured data is converted to an RGB digital signal to obtain digital image data at step S903.

Interpolation processing and a white-balance adjustment are applied to the digital image data at step S904.

This is followed by step S905, at which the photography mode used in photography is read from the selected mode 1105 of the liquid crystal panel 1104. It is determined which of the photography modes 1201 to 1204 of FIGS. 12A to 12D has been read.

Next, at step S906, the photography mode and the color space mode at the time of photography and the content of the captured image data are analyzed and it is judged from the results of analysis whether tonality or color gamut is to be emphasized.

More specifically, since the automatic select mode 1403 has been set as the color space, the determination as to whether tonality is to be emphasized is decided giving precedence to the set content of the photography mode prevailing at this time. As a result, if the photography mode at the time of photography is the portrait mode 1201, for example, it is judged that tonality is to be emphasized and control proceeds to step S907.

On the other hand, if it is found at step S906 that the scenery mode 1202, night scenery mode 1203 or automatic mode 1204 has been selected as a mode other than the portrait mode, then it is judged that a wider color gamut is to be emphasized and control proceeds to step S910.

A 3×3 matrix operation is applied to the image data at step S907 as an n×m matrix operation (where n, m are integers) for sRGB color space to achieve a color correction to sRGB color space. As a result, the image data is converted to fall within an area 1601 bounded by the dashed line of sRGB color space in FIG. 16.

A 3×3 matrix operation is applied to the image data at step S910 as an n×m matrix operation (where n, m are integers) for Adobe RGB color space to achieve a color correction to Adobe RGB color space. As a result, the image data is converted to fall within an area 1602 bounded by the solid line of Adobe RGB color space in FIG. 16.

Figure 16:
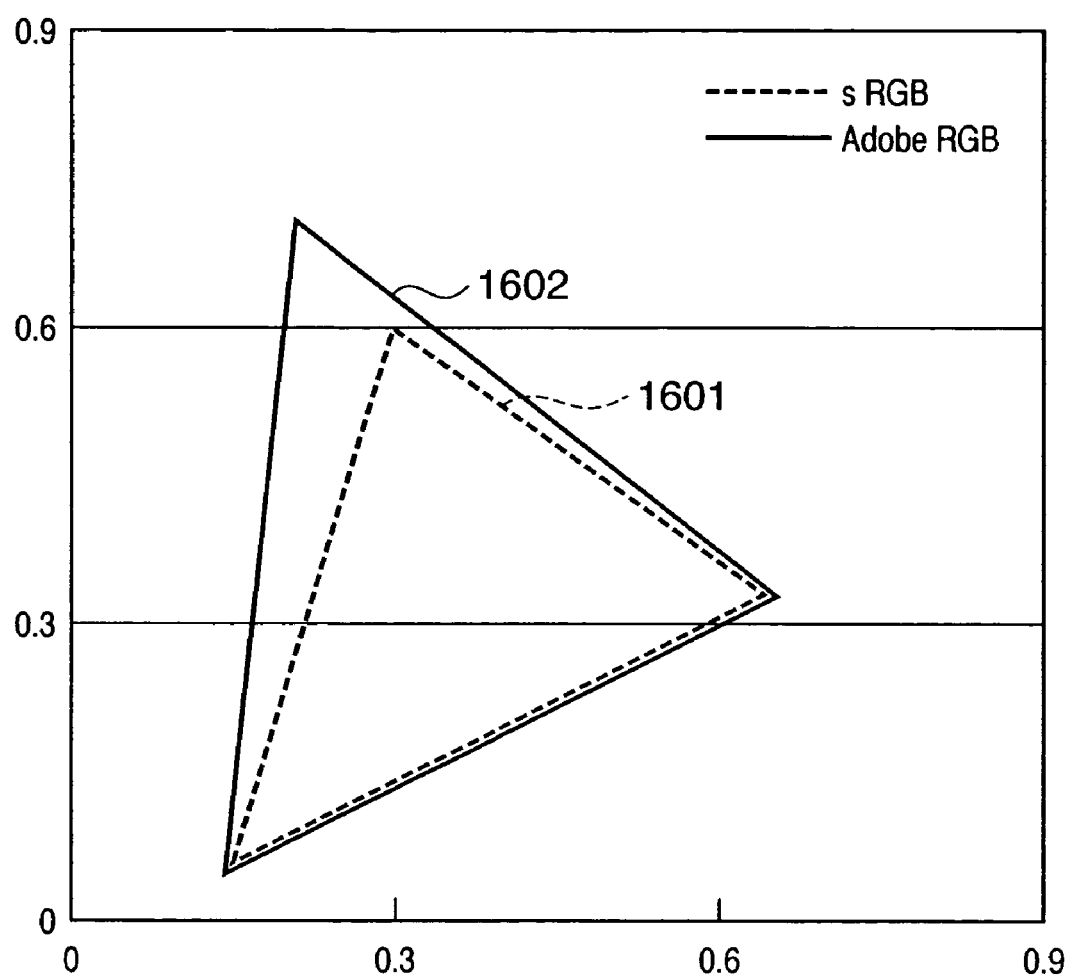
FIG. 16 is an explanatory view illustrating the color gamuts of sRGB color space and Adobe RGB color space.
Figure 17:
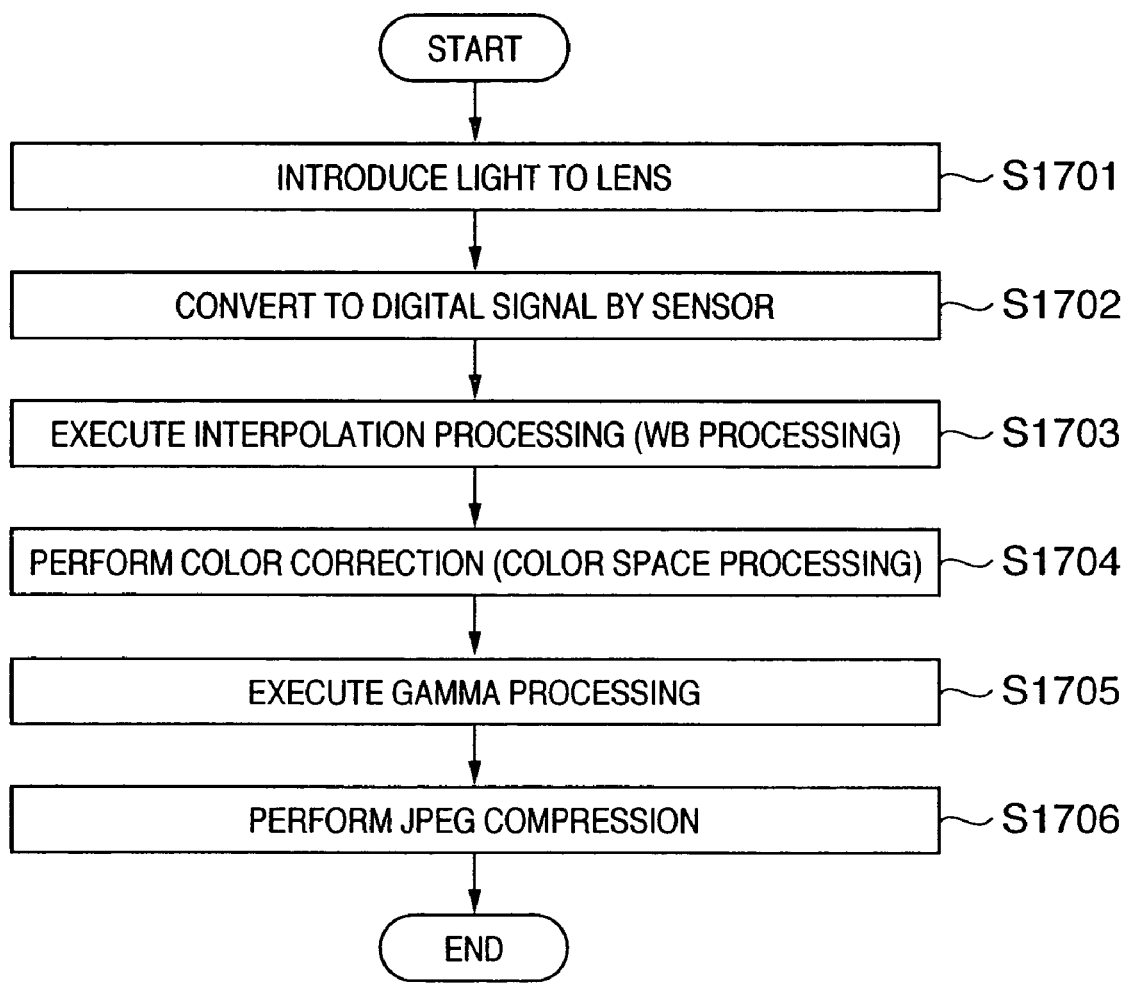
FIG. 17 is a flowchart illustrating image data processing in a digital camera according to the prior art.

As will be obvious from FIG. 16, Adobe RGB color space has a color gamut wider than that of sRGB color space. Therefore, if the bit precisions are the same, tonality in sRGB color space will be 140% higher than tonality in Adobe RGB color space.

A gamma correction for the monitor is applied to the color-corrected image data at step S908.

This is followed by step S909, at which the color-corrected image data is subjected to JPEG compression and then stored as a file. It should be noted that the photography mode that was used in photography is appended to the file header as additional information when the data is stored.

Thus, in accordance with this embodiment as described above, the photography mode and the color space mode at the time of photography and the content of the captured image data are analyzed, it is judged from the results of analysis whether the subject is a person and whether tonality or color gamut is to be emphasized can be identified automatically. If the result of such processing of the image data a determination that a person is the subject, then image data having rich tonality can be created. If it is determined that scenery is the subject, then image data in which a rich color gamut can be reproduced can be created.

A modification of this embodiment will now be described. In a case where the automatic select mode 1403 has been set as the color space mode and, moreover the automatic mode 1204 has been set as the photography mode, it will suffice to execute the analysis processing of step S906 in FIG. 9 as follows:

The content of the data representing the photographed subject is analyzed and the color space is changed over automatically on the side of the digital camera in accordance with the analytical result. For example, the content of the photography data is analyzed, with focal length, magnification and shutter speed, etc., being included in the analysis. If it is judged that the data is data in which a human being is the main subject, sRGB color space emphasizing tonality is selected. If it is judged that the data is data in which the main subject is other than a human being, e.g., scenery, then Adobe RGB color space emphasizing color gamut is selected. Color correction processing is then executed at step S907 or S910 using the color space selected.

Fifth Embodiment

Next, a fifth embodiment of the present invention will be described with reference to FIG. 15. Components identical those of the fourth embodiment described above are designated by like reference characters and need not be described again.

This embodiment will be described in regard to another example of image data processing, namely color correction processing for a case where the Adobe RGB mode 1402 has been selected as the color space and the portrait mode 1201 as the photography mode when a subject is photographed by the digital camera 1100.

The color space is set to the Adobe RGB mode at step S1501 using the selected mode 1105.

Shutter-release button 1303 is pressed at step S1502 in order to photograph the subject.

Next, the subject is photographed using an image sensing device such as a CCD sensor and an optical signal that is the captured data is converted to an RGB digital signal to obtain digital image data at step S1503.

Interpolation processing and a white-balance adjustment are applied to the digital image data at step S1504.

This is followed by step S1505, at which the portrait mode 1201 is read as the photography mode used in photography.

Next, at step S1506, the photography mode and the color space mode at the time of photography and the content of the captured image data are analyzed and it is judged from the results of analysis whether tonality or color gamut is to be emphasized.

More specifically, since the photography mode at the time of photography is the portrait mode 1201, it is judged that a wider color gamut is to be emphasized and control proceeds to step S1511. However, since this processing is outside the scope of this invention, it will not be described here.

A 3×3 matrix operation is applied to the manipulated image data (referred to as "image data A" below) at step S1507 as an n×n matrix operation for sRGB color space to achieve a color correction to sRGB color space. As a result, the image data is converted to fall within an area 1601 bounded by the dashed line of sRGB color space in FIG. 16.

A gamma correction for the monitor is applied to the color-corrected image data A at step S1508.

The image data A is subjected to JPEG compression and then stored as a file at step S1509. When the data is stored, the photography mode used in photography is attached to the file header as additional information.

It is checked at step S1510 whether the color space specified at step S1501 and the color space that has actually undergone the color correction at step S1507 are the same.

If the result of the check is that the two color spaces are the same, processing is exited. On the other hand, if the result of the check is that the two color spaces are not the same, control proceeds to step S1511.

A 3×3 matrix operation is applied to the manipulated image data (referred to as "image data A" below) at step S1507 as an n×n matrix operation for Adobe RGB color space to achieve a color correction to Adobe RGB color space. The image data generated as a result of the color correction is adopted as image data B. The image data B is converted to fall within an area 1602 bounded by the solid line of Adobe RGB color space in FIG. 16.

As will be obvious from FIG. 16, Adobe RGB color space has a color gamut wider than that of sRGB color space. Therefore, if the bit precisions are the same, tonality in sRGB color space will be greater than that in Adobe RGB color space.

The image data B is thenceforth subjected to processing at step S1510. Now since the color space specified at step S1501 and the color space that has actually undergone color correction at step S1511 are both same, i.e., Adobe RGB color space, processing is exited.

If the result of the above processing is that Adobe RGB color space has been specified at step S1501 and that the photography mode is the portrait mode 1201, then processing is executed in the following order: S1506, S1507, S1508, S1509, S1510, S1511, S1508, S1509, S1510, END. As a result, two types of image files are generated, namely an image file of image data A color-corrected to sRGB color space and an image file of image data B color-corrected to both sRGB color space and Adobe RGB color space.

Consequently, the image data A that has been color-corrected to the sRGB color space also can be stored even in a case where a decline in tonality appears in the image data B that has been color-corrected to Adobe RGB color space specified by the user. This makes it possible to rescue precious data acquired by photography.

A modification of this embodiment will now be described. Assume a case where a person is photographed at a party or the like in a room at night. If the Adobe RGB mode 1402 has been selected as the color space and the night scenery mode 1203 as the photography mode in this case, then, in case of ordinary processing, it may seem that it will be determined at step S1506 that the subject is other than a person because the night scenery mode 1203 has been set, and that control will proceed to step S1511 and only one item of image data color-corrected to Adobe RGB color space will be generated.

However, in the analysis processing at step S1506 in this embodiment, a judgement is rendered not only based upon the photography mode. Skin-color recognition is performed by identifying, from hue information for discriminating skin color, whether the photographic data contains a skin-color portion. Furthermore, the area in which the skin color resides is specified based upon the result of this skin-color recognition and this area is approximated by an oval. Then, face recognition is carried out by identifying whether i) a pair of eye areas is present at a prescribed position in this oval or whether ii) an organ such as the nose or mouth is present at a prescribed position in the oval. Information relating to the content of the photographic data obtained as a result of such face recognition and the content of the color space mode setting are subjected to overall analysis simultaneously and it is determined which of tonality or color gamut should be emphasized. Therefore, even though the night scenery mode 1203 has been set, control proceeds to step S1507 in a case where the result of analysis at step S1506 is a judgement that a person is the main subject. Upon generation of one item of image data A that has been color-corrected to sRGB color space (because the color space is different at step S1510), control proceeds to step S1511. Now one more item of image data, namely image data B, that has been color-corrected to Adobe RGB color space is generated. The end result, therefore, is that two types of image data exist.

Thus, in accordance with this example, it is possible to generate a realistic, subtle image in line with the photographic conditions irrespective of the color space mode set by the operator.

Other Embodiments

The present invention can be applied to a system constituted by a plurality of devices (e.g., a host computer, interface, reader, printer, etc.) or to an apparatus comprising a single device (e.g., a copier or facsimile machine, etc.).

Furthermore, it goes without saying that the object of the invention is attained also by supplying a storage medium storing the program codes of the software for performing the functions of the foregoing embodiments to a system or an apparatus, reading the program codes with a computer (e.g., a CPU or MPU) of the system or apparatus from the storage medium, and then executing the program codes.

In this case, the program codes read from the storage medium implement the novel functions of the embodiments and the storage medium storing the program codes constitutes the invention.

Examples of storage media that can be used for supplying the program code are a floppy disk, hard disk, optical disk, magneto-optical disk, CD-ROM, CD-R, magnetic tape, non-volatile type memory card or ROM, etc.

Furthermore, besides the case where the aforesaid functions according to the embodiments are implemented by executing the program codes read by a computer, it goes without saying that the present invention covers a case where an operating system or the like running on the computer performs a part of or the entire process in accordance with the designation of program codes and implements the functions according to the embodiments.

It goes without saying that the present invention further covers a case where, after the program codes read from the storage medium are written in a function expansion board inserted into the computer or in a memory provided in a function expansion unit connected to the computer, a CPU or the like contained in the function expansion board or function expansion unit performs a part of or the entire process in accordance with the designation of program codes and implements the function of the above embodiments.

The present invention is not limited to the above embodiments and various changes and modifications can be made within the spirit and scope of the present invention. Therefore to apprise the public of the scope of the present invention, the following claims are made.

What is claimed is:

1. An image data processing apparatus for processing image data to be printed, comprising:
    a print condition acquisition unit adapted to acquire information relating to a print condition which is instructed by a user, wherein the print condition includes a type of medium or a resolution;
    a selection unit adapted to select a combination of a color space having a wide color gamut and a high bit precision or a combination of a color space having a narrow color gamut and a low bit precision, based upon the acquired information relating to the print condition;
    a conversion unit adapted to convert the input image data to the selected color space and bit precision;
    a color correction unit adapted to execute color correction for the converted image data and generation of printer data; and
    an output unit adapted to output the printer data to a printer,
    wherein the printer forms an image based on the print condition and the selection unit selects the combination of the color space having a narrow color gamut and a low bit precision if a resolution instructed as a printer resolution by a user is a low resolution.

2. An image data processing method for processing image data to be printed, comprising:
    a print condition acquisition step of acquiring information relating to a print condition which is instructed by a user, wherein the print condition includes a type of medium or a resolution;
    a selection step of selecting a combination of a color space and-having a wide color gamut and a high bit precision or combination of a color space having a narrow color gamut and a low bit precision, based upon the acquired information relating to the print condition;
    a conversion step of converting the input image data to the selected color space and bit precision;
    a color correction step of executing color correction for the converted image data and generation of printer data; and
    an output step of outputting the printer data to a printer,
    wherein the printer forms an image based on the print condition and the combination of the color space having a narrow color gamut and a low bit precision is selected at the selection step if a resolution instructed as a print resolution by a user is a low resolution.

3. The method according to claim 2, wherein said selection step is capable of selecting either of 8-bit sRGB color space or 16-bit xRGB color space.

4. A computer-readable medium storing a control program for causing a computer to perform an image data processing method for processing image data to be printed, comprising:
    a print condition acquisition step of acquiring information relating to a print condition which is instructed by a user, wherein the print condition includes a type of medium or a resolution;
    a selection step of selecting a combination of a color space having a wide color gamut and a high bit precision or a combination of a color space having a narrow color gamut and a low bit precision, based upon the acquired information relating to the print condition;
    a conversion step of converting the input image data to the selected color space and bit precision;
    a color correction step of executing color correction for the convened image data arid generation of printer data; and
    an output step of outputting the printer data to a printer,
    wherein the printer forms an image, based on the print condition and the combination of the color space having a narrow color gamut and a low bit precision is selected at the selection step if a resolution instructed as a mint resolution by a user is a low resolution.

* * * * *